Patented Feb. 1, 1938

2,106,969

UNITED STATES PATENT OFFICE 2,106,969

METHOD FOR SEPARATING WAXY CONSTITUENTS FROM OILS

Garland H. B. Davis, Elizabeth, N. J., assignor to Standard Oil Development Company, a corporation of Delaware No Drawing. Application April 28, 1934, Serial No. 722,965

9 Claims. (Cl. 196—19)

The present invention relates to the separation of waxy constituents from hydrocarbon oils, and more specifically to an improved method for effecting such separation more rapidly and completely than is possible by present known methods. The invention will be fully understood from the following description.

Hydrocarbon oils often contain solid waxy constituents which may be removed after dilution of the oil by chilling, which causes the wax to solidify, and by mechanical separation. The separation may be effected by settling, by filtration or by centrifugation, depending on the character of the waxy stock. In many instances the separation is slow and difficult.

It has been found that the separation of waxy constituents can be greatly improved by the use of certain substances which are termed "separation aids" but which are not to be confused with the bulky, earthy materials such as clays and silica now used as filtration aids. The present invention deals with the discovery of a new separation aid, specifically wax tailings. This material is a petroleum product, solid at ordinary temperatures, and obtained by the distillation of wax base or semi-wax base crude oils. Wax tailings comprise the heaviest or the last cut obtained as a distillate before the bottoms cokes. It does not appear to be a tarry or asphaltic material. The color is ordinarily from a dark yellow to a brown, instead of the ordinary jet black appearance of petroleum pitch. Furthermore, it is to be emphasized that the material is recovered as a distillate and not as a residue, as is the case with pitches and tars.

Wax tailings may be added as such to the waxy oil or it may first be given a mild oxidizing treatment with air at ordinary or elevated temperatures, which in many instances increases its potency. In any case the amount added to the waxy oil is between about ½ and 4½%. As a matter of fact, even as little as .1% gives a noticeable effect upon the ease of separation, but it is small and it is preferred to use the material within the limits given above. There appears to be an optimum concentration depending on the oil to be treated and the potency of the particular sample of wax tailings, and this optimum usually falls between about 1½ and 3½%.

It will be understood that the waxy oil should be diluted in order to make the separation easier in the usual way, and as the diluent may be selected any one of a great many known materials. As examples of suitable diluents, the liquefied normally gaseous hydrocarbons may be mentioned, such as propane or butane or the corresponding olefins, used alone or admixed with each other or with ethane, ethylene or amylene and the like. Naphthas may also be used as well as liquid aromatic hydrocarbons such as benzol, toluol or xylol. Another class of diluents is the broad class of oxygen-containing liquid organic substances. These materials fall broadly within the class of the lower alcohols, ethers, esters, ketones, aldehydes and acids. Many of these substances are well known as wax precipitants and they may be used alone in some cases or preferably when admixed with solvents of the class of naphthas, liquid aromatic hydrocarbons or chlorinated hydrocarbons, such as carbon tetrachloride or trichlorethylene. Among the particular alcohols which are desirable may be mentioned ethyl, methyl, propyl and butyl alcohols, also amyl alcohol. The latter two of these may be used alone but it is preferable to use the former either with naphtha or a liquid aromatic hydrocarbon. Methyl or ethyl or methyl-ethyl ethers or any of the other ethers corresponding to the above mentioned alcohols may be used. The esters which are most desirable are the formates or acetates; for example, methyl or ethyl formate, the propyl, butyl or amyl acetates. Acetones, di-ethyl and di-methyl or ethyl-methyl ketones may be used, and are preferably admixed with liquid aromatic hydrocarbons. It will be understood that these particular diluents are not new in the art but in each case there is believed to be an active cooperation between the diluent and the separation aid which makes a more rapid separation possible, together with a greater yield of oil and a better quality of wax.

The following solvent mixtures may be considered to show in general the amounts which are satisfactory for dewaxing 140 sec. (Saybolt at 210° F.) to —5° F. using 65 parts of the solvent to 35 of waxy oil. It will be understood that these proportions may change; for example if a larger amount of the solvent is used in proportion to the oil, a larger amount of the first mentioned solvent can be used. As the separation temperature is reduced, the amount of the first used component should be decreased.

| | Per cent |
|---|---|
| Normal butyl alcohol | 42.5 |
| Naphtha | 57.5 |
| Secondary butyl alcohol | 60 |
| Naphtha | 40 |
| Secondary butyl alcohol | 63 |
| Toluol | 37 |

| | Per cent |
|---|---|
| Secondary butyl alcohol | 5 |
| Secondary butyl acetate | 95 |
| Secondary butyl alcohol | 30 |
| Secondary amyl acetate | 70 |
| Secondary amyl alcohol | 22 |
| Naphtha | 78 |
| Secondary amyl alcohol | 17 |
| Toluol | 83 |
| Secondary amyl alcohol | 10 |
| Secondary butyl acetate | 90 |
| Secondary amyl alcohol | 30 |
| Secondary amyl acetate | 70 |
| Synthetic amyl alcohol prepared from amyl chloride | 80 |
| Naphtha | 20 |
| Synthetic amyl alcohol prepared from amyl chloride | 80 |
| Benzol | 20 |
| Synthetic amyl alcohol prepared from amyl chloride | 80 |
| Toluol | 20 |
| Diacetone alcohol | 30 |
| Toluol | 70 |
| Mesityl oxide | 90 |
| Naphtha or benzol or toluol | 10 |
| Ethyl carbonate | 65 |
| Naphtha, benzol or toluol | 35 |
| Ethyl carbonate | 15 |
| Secondary butyl acetate | 85 |
| Ethyl carbonate | 20 |
| Secondary amyl acetate | 80 |
| Acetone | 7 |
| Naphtha | 93 |
| Acetone | 90 |
| Benzol or toluol | 10 |
| Isopropyl alcohol | 23½ |
| Naphtha | 76½ |
| Isopropyl alcohol | 33⅓ |
| Toluol | 66⅔ |
| Isopropyl alcohol | 10 |
| Secondary butyl acetate | 90 |
| Isopropyl alcohol | 20 |
| Secondary butyl acetate | 80 |
| Ethylene dichloride | 65 |
| Secondary butyl acetate | 35 |
| Ethylene dichloride | 10 |
| Secondary amyl acetate | 90 |
| Methyl ethyl ketone | 25 |
| Toluol | 75 |

The amount of the diluent used varies with the particular one employed, but in general they are used in proportions of from 1 to 4 volumes of the diluent or solvent to 1 volume of the waxy oil.

The diluted waxy oil mixture to which the separation aid is added is cooled to solidify the wax and the rate of chilling may be slow, as is now the practice, but it is found that the rate may be greatly increased when the separation aid is present; for example, it may be in excess of 10 or even 25° F. per hour and still produce a readily separable wax. The chilling may be sufficiently rapid to be described as "shock" chilling.

The mechanical method of separation is either filtration, gravity separation or separation by means of centrifuge. The particular method of separation to be selected usually depends on the quality of the wax. Those of good crystal structure are usually to be filtered, while those of less clearly defined structure are preferably separated either by gravity settling or by centrifuge. However, it has been found that the effect of the separation aids is to cause all types of waxes to be more readily separated by any of the particular methods than could be accomplished without the aid. While the preferred mode of separation depends primarily on the particular type of waxy stock, it also depends on the diluent selected and in some cases cold settling or centrifugation is decidedly preferably to filtration. On the other hand, some of the solvents or diluents have a density which is substantially the same as that of the wax and in such cases separation by gravity or by the centrifuge is slow indeed, and in these cases filtration is preferred.

To illustrate the effect of the separation aids, wax tailings were added to different samples of waxy oil in proportions of from 1 to 4%. The oil was a lubricating oil having a viscosity of 75 seconds Saybolt at 210° F. and each sample was diluted with naphtha in proportion of 7 volumes of the solvent to 3 of the waxy oil. The mixture was stirred so as to be homogeneous and chilled to 0° F. The different samples were then allowed to stand in 500 c. c. graduated flasks maintained at 0° F. and at intervals of 16 and 40 hours the volume of the supernatant liquid was read. These data are recorded in the following table:

| | Volume of clear liquid after— | |
|---|---|---|
| | 16 hours | 40 hours |
| Blank (no wax tailings) | 0 | 0 |
| Blank +1% wax tailings | 325 | 325 |
| Do. +2% do. | 465 | 475 |
| Do. +3% do. | 350 | |
| Do. +4% do. | 310 | 320 |

From the above table it will be seen that the blank sample would not settle at all but that the separation aid effected wax separation readily. If the above data are plotted, the amount of the clear liquid against the amount of separation aid used, it will be found that there is an optimum at about 2.3% of wax tailings.

The present invention is not to be limited by any theory of the mechanism of the wax separation aids, nor to any particular diluent or to any method of wax separation, but only to the following claims in which it is desired to claim all novelty inherent in the invention.

I claim:

1. An improved method for separating waxy constituents from oils, comprising diluting the waxy oil, adding a small quantity of wax tailings thereto, chilling to solidify the wax, and separating the solidified wax from the diluted oil.

2. Process according to claim 1 in which the diluent comprises a liquefied normally gaseous hydrocarbon.

3. Process according to claim 1 in which the diluent comprises a liquid normally gaseous hydrocarbon and the wax tailings are in proportion from about ½ to 4½%.

4. Process according to claim 1 in which the diluent comprises naphtha.

5. In the art of dewaxing wax-containing oils involving separation of wax from oil, the step of preparing the oil for separation of wax therefrom, which comprises adding thereto a heavy hydrocarbon distillate comprising high boiling fractions obtained by distilling hydrocarbon residues until they become substantially solid.

6. In the art of dewaxing wax-containing oils involving separation of wax from oil, the step of preparing the oil for separation of wax therefrom which comprises adding to the oil a high boiling distillate of a heavy hydrocarbon fraction obtained as a result of distilling said fraction until a residue of coke is formed.

7. In a process for dewaxing a wax-containing oil involving separation of wax from oil, the steps which comprise diluting the oil with a solvent which will not to substantial extent react with the oil, and adding to the oil a heavy hydrocarbon distillate comprising high boiling fractions obtained when hydrocarbon residues are distilled to substantially solid form, whereby the wax is rendered more easily separable from the oil.

8. In a process for dewaxing a wax-containing oil involving separation of wax from oil, the steps which comprise diluting the oil with a solvent which will not to substantial extent chemically react with the oil, incorporating with the diluted oil a heavy hydrocarbon distillate comprising high boiling fractions obtained when hydrocarbon residues are distilled to substantially solid form, thereby to condition the oil to cause wax agglomeration, and chilling the diluted oil to cause solidification of wax.

9. A process for dewaxing a wax-containing oil, which comprises adding to the oil a heavy hydrocarbon distillate comprising high boiling fractions obtained when hydrocarbon residues are distilled to substantially solid form, thereby to condition the wax-containing oil to cause agglomeration of wax therein, chilling the oil, and removing wax from the oil.

GARLAND H. B. DAVIS.